US011676194B2

(12) United States Patent
Pande et al.

(10) Patent No.: US 11,676,194 B2
(45) Date of Patent: Jun. 13, 2023

(54) FACETED ITEM RECOMMENDATION SYSTEM

(71) Applicant: Target Brands, Inc., Minneapolis, MN (US)

(72) Inventors: Amit Pande, Ames, IA (US); Kai Ni, Minneapolis, MN (US); Jacob Portnoy, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 309 days.

(21) Appl. No.: 17/067,021

(22) Filed: Oct. 9, 2020

(65) Prior Publication Data

US 2021/0110458 A1 Apr. 15, 2021

Related U.S. Application Data

(60) Provisional application No. 62/913,013, filed on Oct. 9, 2019.

(51) Int. Cl.
```
G06Q 30/00      (2023.01)
G06Q 30/0601    (2023.01)
G06F 9/54       (2006.01)
G06N 5/04       (2023.01)
G06F 16/9535    (2019.01)
G06N 20/00      (2019.01)
```
(52) U.S. Cl.
CPC ......... *G06Q 30/0631* (2013.01); *G06F 9/547* (2013.01); *G06F 16/9535* (2019.01); *G06N 5/04* (2013.01); *G06N 20/00* (2019.01); *G06Q 30/0623* (2013.01); *G06Q 30/0643* (2013.01)

(58) Field of Classification Search
CPC .......... G06Q 30/0631; G06Q 30/0623; G06Q 30/0643; G06Q 30/06–08; G06N 20/00; G06N 5/04; G06F 16/9535; G06F 9/547
See application file for complete search history.

(56) References Cited

U.S. PATENT DOCUMENTS

| | | |
|---|---|---|
| 7,949,573 B1 | 5/2011 | Cohen et al. |
| 8,285,602 B1 | 10/2012 | Yi et al. |
| 8,326,690 B2 | 12/2012 | Dicker et al. |
| 8,392,281 B1 | 3/2013 | Bashir et al. |

(Continued)

OTHER PUBLICATIONS

Tomas Mikolov, Ilya Sutskever, Kai Chen, Greg S Corrado, and Jeff Dean. Distributed representations of words and phrases and their compositionality. In Advances in neural information processing systems, pp. 3111-3119, 2013.

(Continued)

*Primary Examiner* — Ethan D Civan
(74) *Attorney, Agent, or Firm* — Merchant & Gould P.C.

(57) ABSTRACT

Methods and systems for generating and presenting item recommendations to a user at a retail website is disclosed. One method includes generating a set of item recommendations based on a selected item from a retail website. The method also includes identifying one or more facets in the set of item recommendations, and, for each of the one or more facets, identifying a subset of items from the set of item recommendations affiliated with the facet. The method also includes generating a user interface including the selected item and a recommendation region displaying at least some of the subset of items affiliated with the facet.

19 Claims, 14 Drawing Sheets

(56) References Cited

U.S. PATENT DOCUMENTS

| | | | |
|---|---|---|---|
| 10,095,771 B1* | 10/2018 | Dykstra | G06F 16/285 |
| 2012/0109778 A1 | 5/2012 | Chan et al. | |
| 2017/0109412 A1* | 4/2017 | Daya | G06F 16/24578 |
| 2018/0285958 A1 | 10/2018 | Bender et al. | |
| 2019/0356937 A1* | 11/2019 | Huang | H04N 21/251 |
| 2020/0250734 A1 | 8/2020 | Pande et al. | |

OTHER PUBLICATIONS

Karen Simonyan and Andrew Zisserman. Very deep convolutional networks for large-scale image recognition. arXiv preprint arXiv:1409.1556, 2014.

* cited by examiner

FACETED ITEM RECOMMENDATION SYSTEM

PRIORITY CLAIM

This application claims the benefit of U.S. Provisional Application Ser. No. 62/913,013, filed Oct. 9, 2019, entitled "Faceted Item Recommendation System," the entire disclosure of which is hereby expressly incorporated herein by reference.

BACKGROUND

Customers visiting a retail site may browse various categories to identify an item for purchase. Such customers may wish to purchase an item of a particular type, and would not normally browse for other items that they may have interest in, but which do not come to mind at the time they are browsing the site. Accordingly, a retailer may only sell to the customer the item the customer is seeking, despite the fact that the customer would be interested in other items that might be useable with the item purchased.

Existing item recommendation systems that are implemented on retail web sites identify items to be recommended to customers in a number of ways. For example, items may be identified and recommended to customers based on popularity of the item, or based on the fact that the item was previously viewed by the customer. Still further, other systems may attempt to derive item selections for purposes of generating item recommendations based on similarities between the item being viewed and items to be recommended based on the item that is viewed.

Existing item recommendation systems have drawbacks. For example, although recommended items may be presented to a customer based on the customer's past browsing behavior or behavior of similar customers, new items that may be added to an item collection would not be identified for inclusion in such item recommendations.

SUMMARY

Generally, the present disclosure relates to methods and systems for generating product recommendations from among a set of items in an item collection, such as products available at a retailer website. In some example aspects, specific faceted recommendations may be presented to a user. For example, a set of recommendations may be generated by a recommender system, but those recommendations may be selected according to a common attribute, with recommended items being ranked in terms of likelihood of selection, but only for items having that common attribute. The common attribute may be automatically generated, for example, a common brand, a common color, a common appearance (e.g., apparel having common sleeve length, etc.), or other types of attributes or themes. In some cases, product recommendations may be generated from weighted graphs that are generated from item images and item descriptions, and weights are generated based on user activity indicating a relationship between two items in an item collection. Other methods of generating product recommendations are useable as well.

In a first aspect, a method of generating and presenting item recommendations to a user at a retail website is disclosed. The method includes receiving a selection of an item from an item collection, the item collection corresponding to items available for purchase from the retail website. The method further includes generating a set of item recommendations based on the selected item, the set of item recommendations being generated based on selection of a predetermined number of nearest neighbors from a weighted graph of items included in the item collection. The method also includes identifying one or more facets in the set of item recommendations, and, for each of the one or more facets, identifying a subset of items from the set of item recommendations affiliated with the facet. The method also includes generating a user interface including the selected item and a recommendation region displaying at least some of the subset of items affiliated with the facet.

In a second aspect, an item recommendation system includes a recommendation generation computing system comprising a processor and a memory. The memory stores instructions executable by the processor to perform: receive a selection of an item from an item collection, the item collection corresponding to items available for purchase from a retail website; generate a set of item recommendations based on the selected item, the set of item recommendations being generated based on selection of a predetermined number of nearest neighbors from a weighted graph of items included in the item collection; identify one or more facets in the set of item recommendations, and, for each of the one or more facets, identify a subset of items from the set of item recommendations affiliated with the facet. A user interface including the selected item and a recommendation region displaying at least some of the subset of items affiliated with the facet is generated.

In a third aspect, an item recommendation system includes a computing system comprising a plurality of computing devices. The plurality of computing devices include a retail website server and an item recommendation computing device. The computer system stores instructions, which when executed, cause the computing system to perform: generate a set of item recommendations based on the selected item, the set of item recommendations being generated based on selection of a predetermined number of nearest neighbors from a weighted graph of items included in an item collection; receive a user selection of an item from the item collection; provide the selection to the item recommendation computing device via an API; in response to receiving the selected item, identify, at the item recommendation computing device, one or more facets in the set of item recommendations, for each of the one or more facets, identify a subset of items from the set of item recommendations affiliated with the one or more facets; and generate, at the retail website server, a user interface including the selected item and the subset of items.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
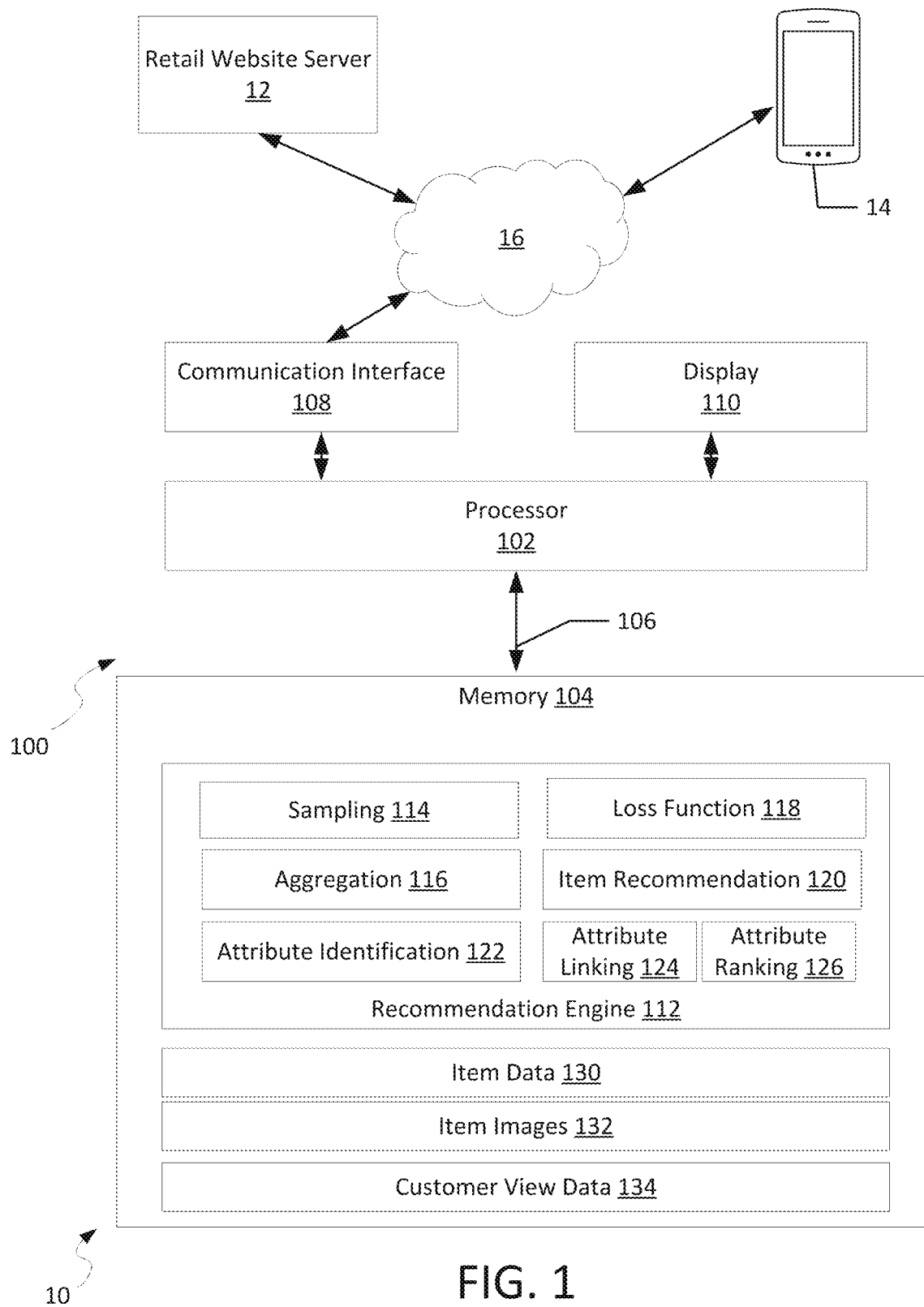
FIG. 1 illustrates a system for presenting items in an online environment, and in particular in a retail context, according to an example embodiment.

As briefly described above, embodiments of the present invention involve generating and presenting item recommendations from among a set of items in an item collection, such as products available at a retailer website. In some example aspects, specific faceted recommendations may be presented to a user. For example, a set of recommendations may be generated by a recommender system, but those recommendations may be selected according to a common attribute, with recommended items being ranked in terms of likelihood of selection, but only for items having that common attribute. The common attribute may be automatically generated, for example, a common brand, a common color, a common appearance (e.g., apparel having common sleeve length, etc.), or other types of attributes or themes. Items may be presented according to various other commonalities as well, e.g., based on having a common attribute, or based on having a variety of different properties according to a given attribute (e.g., the same piece of apparel or type of apparel in different colors, from different brands, same type of food in different flavors, etc.). Accordingly, and in the context of the present disclosure, item recommendations may be presented alongside a selected item based on one or more "facets," generally corresponding to categories of commonalities across items.

In some example implementations, the item recommendations are initially generated using convolutions on weighted graphs. Generally, this includes performing sampling, weighting, and aggregation processes for purposes of modeling relationships among items to identify such item recommendations. In example implementations, weights in graphs (e.g., edge weights) are used for sampling, aggregation as well as generation of random walks, and measuring loss. Accordingly, such a framework can be used to generate related product recommendations for a retailer to present to a user, e.g., in an online retail environment.

In some embodiments, related product recommendations can be generated for a retailer to combine the insights from (a) product or item description (text), (b) item images, and (c) purchase behavior (views/add-to-cart/purchases) into a single framework. Such a combination of image and text descriptions provides certain advantages in terms of accuracy of generated recommendations relative to image or item attributes-based deep learning, or unweighted graph based approaches. In particular, in the context of items presented by a retail website, the links between nodes of a graph convey specific information which is not properly captured by existing architectures. The weights between nodes may signify the cost or advantages or popularity of a transition from one node to another. For example, weights between two nodes in a graph may represent the probability of co-views, co-purchases, rate of substitution or cost of substitution, depending on the application usage.

Use of such weighted links between nodes, in combination with graph-based convolutions, allow neural networks to retain a state that can represent information from its neighborhood with arbitrary depth. Still further, by using attribute-based deep learning, recommendations among products based on specific attributes may be easily generated.

Once item recommendations are generated based on specific attributes, the attributes may be identified and recommendations may be presented to a user in an organizational scheme based on the attribute. For example, given a selected item, other items may be presented to the user that have a common attribute with the item, for example, a common color, brand, style, pattern, etc. Additionally, items may be presented to a user according to different categories within a single attribute, for example, apparel having a crew neck, v-neck, polo collar, etc. may be presented in separate logical groupings of item recommendations.

Referring to FIG. 1, a system 10 for presenting items in an online environment based on other item selections is shown, and in particular in a retail context, according to an example embodiment. The system 10 includes a recommendation modeling computing system 100, communicatively connected to a retail web server 12 and a user device 14 via network 16 (e.g., the Internet). The retail web server 12 presents items to a user device 14, which displays such items to the user via either a browser or application.

The recommendation modeling computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores a recommendation modeling engine 112, discussed in further detail below. The computing system 100 can also include a communication interface 108 configured to receive and transmit data, for example to access data in an external database, or to provide such item recommendations to a retail web server 12 for presentation to a user device 14. Additionally, a display 110 can be used for viewing recommendation information generated by the recommendation modeling engine 112.

In various embodiments, the recommendation modeling engine 112 performs a process including sampling, weighting, and aggregation of graph-based data, generated from a combination of image data 130, item data 132 (e.g., text descriptions of items), and user selection data 134 (e.g., page or item views, item selections, purchases, etc.). Details regarding use of such data is provided below.

In one example embodiment, the recommendation modeling engine 112 includes a sampling subsystem 114, an aggregation subsystem 116, a loss function 118, and an item recommendation subsystem 120. In still further example embodiments, the recommendation modeling engine 112 may include an attribute identification subsystem 122 and an attribute linking subsystem 124.

In the embodiment shown, the sampling subsystem 114 performs a graph sampling using a graph convolutional network (GCN). GCNs perform propagation guided by a graph structure. Accordingly, for any particular node, neighbors are selected for convolution. In an example embodiment described below, a subset of neighbors for any given node is selected based on edge weights of neighbors. Generally, the larger the weight of the edge, the greater the chances that a corresponding neighbor should be selected for sampling. Additional details are provided below in connection with FIG. 2 regarding sampling.

In the embodiment shown, the aggregation subsystem 116 obtains the selected neighbors for aggregation to the corresponding nodes for information clustering. This can include, for example, incrementally adding information from neighboring nodes while accounting for edge weights between the node and the neighboring node. Example aggregation functions can include a mean aggregator, a long-short term memory (LSTM) aggregator, a pooling aggregator, node2vec, or GCN. Other aggregation functions are useable as well.

In the embodiment shown, the loss function 118 is applied to output representations of the aggregation, and trains weight matrices and parameters of the aggregator functions using a stochastic gradient descent. Accordingly, the graph-based loss function 118 encourages nearby nodes to have similar representations, while enforcing that representations of the disparate nodes are distinct. Additional details regarding the loss function 118 are provided below in connection with FIG. 2.

In the embodiment shown, the item recommendation subsystem 120 receives the model generated using the sampling subsystem 114, the aggregation subsystem 116, and the loss function 118. The item recommendation subsystem 120 utilizes a model generated from the other subsystems and can receive an identification of an item within an item collection, e.g., from a retail web server 12. The item recommendation subsystem 120 can then utilize the model to identify one or more recommended items in response, which can be provided to the retail web server 12 for presentation to a user, as described below. The one or more recommended items can include one item, or a series of items.

Notably, the item collection on which the selection of items is generated may be modified relative to an item collection from which the model is generated (e.g., due to addition of items or removal of items). Accordingly, although an overall item collection may change over time, recommendations may be generated for that entire collection of items, including those which have been added since the initial (or an updated) item collection model was created.

In example embodiments that include the attribute identification subsystem 122 and attribute linking subsystem 124, the recommendation modeling engine 112 may generate recommendations of items according to a common attribute rather than based on overall similarity to the selected item. For example, the attribute identification subsystem 122 may receive the one or more recommended items from the item recommendation subsystem 120 and may parse the set of recommended items to identify those items which are both near neighbors to the selected item and which have a same common attribute as the selected item. Additionally, an attribute ranking subsystem 126 may rank the identified common attributes based on the overall similarity of items sharing the common attribute with the selected item. For example, the attribute identification subsystem 122 may receive a list of similar apparel items from the item recommendation subsystem 120 in response to a user selecting a particular apparel item, e.g., a dress. The attribute identification subsystem 122 would then assess the recommended items and identify attributes that contribute to the identified similarity; e.g., a common brand, a common color, a common pattern, a common theme, etc. The attribute ranking subsystem 126 could then rank the identified attributes according to which is a strongest indicator of similarity. For example, a common pattern or theme may be a stronger indicator of similarity between two dresses as compared to a common color or common brand. As such, the overall attributes, e.g., pattern, theme, color, or brand, would be ranked. Items within a single attribute group could be presented to a user with an indication of the attribute, so the user would know the reason why the items are presented.

Additionally, in some embodiments, the specific attributes that are ranked may be ranked dynamically using reinforcement learning. For example, as users select items from specific categories (i.e., attributes, or facets), those selections may be incorporated into future attribute rankings. Still further, initial rankings of attributes may be determined by using a crowd sourcing model. Additional ways in which recommendations may be selected for inclusion within a given attribute or category may include ensuring that a minimum number of recommendations are presented to a user, optimizing runtime recommendation generation, presenting recommendations in each of the available identified categories of recommended items, or consideration of quantitative features (e.g., recommending items having a similar size or volume as compared to the currently selected item).

Referring now to FIGS. 2-11, an example methodology for identifying recommended items is described, in conjunction with one possible methodology. It is noted that, in the context of the present disclosure, the methods described in conjunction with FIGS. 2-11 represent only some possible methods by which item recommendations may be generated. Specifically, any item recommendation system capable of automatically generating item recommendations that can then be analyzed and sub-selected based on attribute or other characteristic (e.g., per facet) could be used to create item recommendation facets for presentation to a user.

Figure 2:
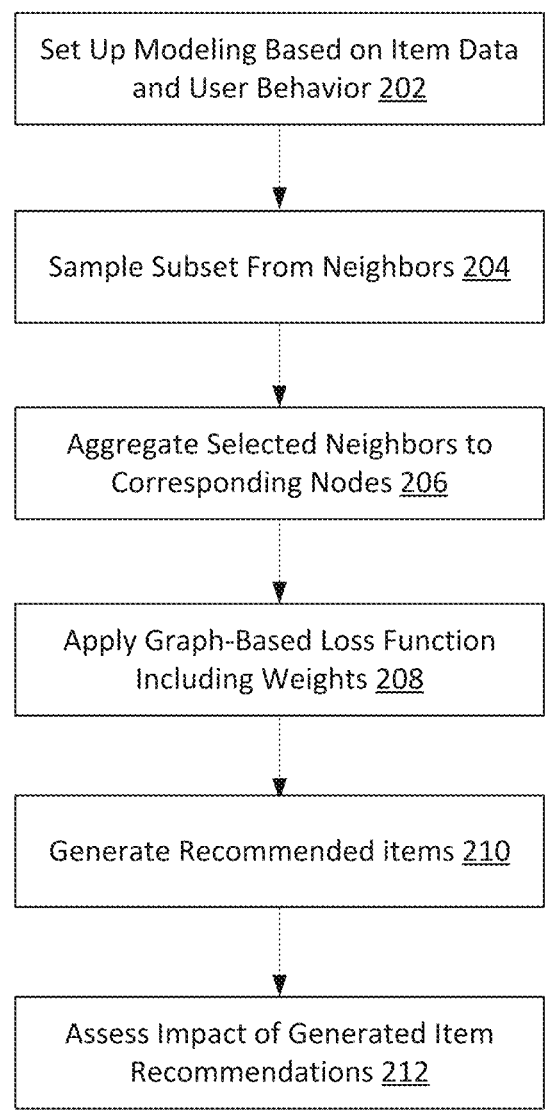
FIG. 2 illustrates a flowchart of a method for identifying recommended items from within an item collection, according to an example implementation.

FIG. 2 illustrates a flowchart of a method 200 for identifying recommended items from within an item collection, according to an example implementation. The method 200 can be performed using the system 10 of FIG. 1, above, and in particular the recommendation modeling computing system 100. In particular, the method 200 can be used to identify items that are in some way related to an initially selected item (as identified by, e.g., prior user activity).

In the embodiment shown, the method 200 includes setup for modeling useable to generate item recommendations (step 202). Setup can include, for example, generating a weighted graph of items in an item collection. The weighted graph can be generated based on item information and item selection information. For example, a graph can be generated from item images and item descriptions, with weights between items being generated based on item selection information (e.g., the likelihood that a user selecting one item will select another item from within the item collection). The item selection information can be based on user activity such as page views, item selections, purchases, etc. from a retailer website providing access to the item collection.

In example embodiments, the weights applied to the graph can be generated in a number of ways. Generally, each item represents a node, with relationships between nodes being weighted. Such weights may be, for example, generated based on a Jaccard index or based on weighted co-occurrences.

Additionally, node embeddings are generated for each node, based on information available about that node. In example embodiments, node embeddings can be generated based on all or some portion of the item data available. In the case of retail items available on a retail web server, item information can include text information (e.g., item descriptions) and image information. Other information may be utilized as well.

Continuing with FIG. 2, the method 200, in the embodiment shown, includes performing a sampling operation on the weighted graph at step 204. Sampling is very important in Graph Convolutional Networks (GCNs). As opposed to computer vision, where convolutional neural networks can use pixel proximity as a feature, GCNs do propagation guided by the graph structure. Accordingly, for any given node, the neighbors used for convolution must be selected efficiently. In accordance with the present disclosure, a neighbor function, $\mathcal{N}_* : V \rightarrow 2^V$, samples a subset of any given node $v \in V$ based on the edge weights of its neighbors. By way of contrast to existing systems, which select neighbors randomly and according to a uniform distribution, in the present disclosure neighbors are selected with a probability proportional to $s(u,v)^\beta$, where $s(u,v)$ is a weight of the edge and $\beta$ is a sampling degree parameter. The larger the weight of the edge, the greater the chance that a corresponding neighbor should be selected in sampling. When $\beta=0$, application of edge weights is neutralized, while larger values of $\beta$ imply that only neighbors with large edge weights will be selected. In an example embodiment, pseudocode for such a sampling algorithm may be depicted as follows:

Input: Graph $\mathcal{G}(V, \varepsilon)$ and a weight function $s(u, v)$ for any
$(u, v) \in \varepsilon$, a sampling hyper-parameter $\beta$
Output: Graph with homogeneous number of neighbors.
for each $u \in V$ do
   $\omega(u, v) = k s(u, v)^\beta$, $\forall v \in V$ s.t. $\Sigma_{all v} \omega(u, v) = 1$
   sample $v \in V$ based on $\omega(u, v)$
end for Still continuing with FIG. 2, the method 200 includes aggregating selected neighbors to corresponding nodes at step 206. In the aggregating operation, if there are two sources of input features (e.g., text and images, as in the example embodiments described herein), those two sources of input features can be combined as follows: $x_v = \sigma(x_{v1} + \mathcal{W}^0 \cdot x_{v2}), \forall v \in V$, where $\mathcal{W}^0$ is a linear transformation matrix to ensure xv1 and xv2 in the same dimension and is a trainable parameter in training. Additionally, $\sigma$ is a nonlinear element wise function.

Accordingly, at each iteration, or search depth, nodes aggregate information from their local neighbors. As this process iterates, nodes incrementally gain more and more information from further reaches of the graph from their neighbors. However, unlike prior works, a hidden state $h_u^{k-1}$ is discounted using the edge weight in aggregation to the state of node v. A multiplicative factor $s(u,v)^\gamma$ can be used to incorporate the importance of item-to-item view dependency so that higher weights are aggregated more than lower weights. An additional parameter, $\gamma$, also defines the extent to which neighbor weighting affects modeling. When $\gamma=0$, the multiplicative factor is neutralized; for larger values of $\gamma$, neighbors with higher weights contribute more to the aggregation. In an example embodiment, pseudocode for such an aggregation algorithm may be depicted as follows:

Input: Graph $\mathcal{G}'$ (V', $\varepsilon$'): input features $\{x_v, \forall v \in V\}$: depth
K: weight matrices $\mathcal{W}^k$, $\forall k \in \{1 \ldots K\}$: non-linearity
$\sigma$: differentiable aggregator functions $\pi_k$, $\forall k \in \{1, \ldots, K\}$:
neighborhood function $\mathcal{N} : V \rightarrow 2^V$: edge weight function
$s(u, v)$, $\forall (u, v) \in \varepsilon$.
Output: Vector representations $z_v$ for all $v \in V$
$h_v^0 \leftarrow x_v / \|x_v\|$, $\forall v \in V$.
for each $k \in \{1, \ldots, K\}$ do
  for each $v \in V$ do
    $h_{\mathcal{N}(v)}^k \leftarrow \pi_k(\{\omega^\gamma h_u^{k-1}, \forall u \in \mathcal{N}(v)\})$ (5)
    $h_{\mathcal{N}(v)}^k \leftarrow h_{\mathcal{N}(v)}^k / \|h_{\mathcal{N}(v)}^k\|$
    $h_v^k \leftarrow \sigma(\mathcal{W}^k \cdot \text{CONCAT}(h_v^{k-1}, h_{\mathcal{N}(v)}^k))$
  end for
    $h_v^k \leftarrow h_v^k / \|h_v^k\|$
end for
    $z_v \leftarrow h_v^K$, $\forall v \in V$ As seen in the above, the aggregation function $\pi_k$, $\forall k \in \{1, \ldots, K\}$ could be any of a number of aggregation functions, such as a mean aggregator, a long-short term memory (LSTM) aggregator, a pooling aggregator, a node2vec algorithm, or a graphical convolutional network (GCN). Other aggregation functions could be used as well.

Continuing with FIG. 2, a graph-based loss function is applied to the output representations $z_u$, $\forall u \in V$, of the aggregation (step 208). The weight matrices $W_k, \forall K \in \{1, \ldots, K\}$ and parameters of the aggregation functions are trained via stochastic gradient descent. The graph-based loss function encourages nearby nodes to have similar representations, while enforcing that representations of disparate nodes remain distinct:

$$\mathcal{L}_\mathcal{G}(z_u) = -r(u,v)^\alpha \quad \log(\sigma(z_u^T z_u)) - Q \cdot \mathbb{E}_{v_n \sim P_n(v)} \log(\sigma(-z_u^T z_{v_n})),$$

In this loss function representation, v is a node that co-occurs near u on a fixed-length random walk, σ is the sigmoid function, $P_n$ is a negative sampling distribution, and Q defines the number of negative samples. Additionally, r(u, v) is an accumulated mean of the weights on the random walk for node u and v and α is another hyperparameter to be tuned for the exponential degrees of weights on random walks. In an example implementation, a geometric mean of weights along the random walk is used for r(u, v). Other selections could include, for example, arithmetic mean, maximum of weights of edges along the path. By adding the weights into the loss function, the algorithm becomes more focused on minimizing the distance between nodes u and v with larger edge weights.

Once the weighted loss function is applied, the output of convolution of the sampled weighted graph can be used to generate recommended items at step 210. The recommended items can include one or more item recommendations representing neighbors of a selected item. The selected item may be an item selected by receiving the item from a retail web server, e.g., in response to a user selecting that item for display from an item collection. Item recommendations can be returned to the retail web server for display to the user. The returned item recommendations can be returned in the form of an item identifier for each nearest neighbors according to a predetermined threshold of one or more items to be recommended. In some instances, 2-4 or more items may be recommended to the user.

In addition, optionally, within the method 200, impact of the generated item recommendations can be assessed at step 212. This may include, for example, determining a rate of selection of item recommendations generated according to the methodology described herein. Such a rate of selection can be used to tune the parameters of a model generated as described herein, for example, to improve performance, or to compare to other item recommendation approaches. Example ways in which impact of item recommendations can be assessed are described below.

Figure 3:
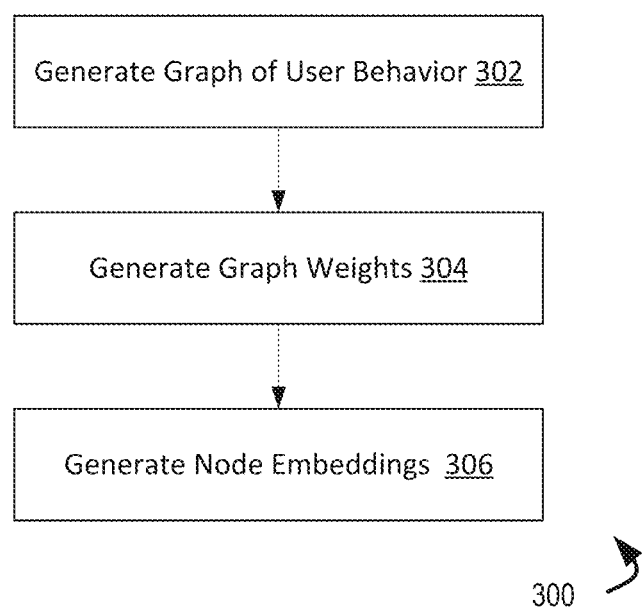
FIG. 3 illustrates a flowchart of a method for initializing a model useable to generate recommended items from within an item collection.
Figure 4:
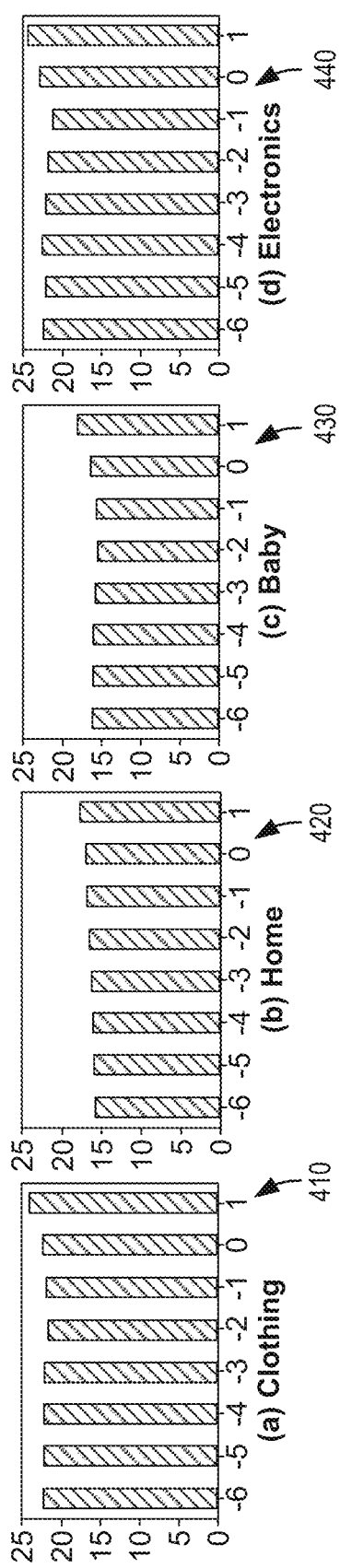
FIGS. 4A-D illustrate effects of altering a sampling parameter on rates of viewing of recommended items, utilizing the item recommendation systems described herein.
Figure 5:
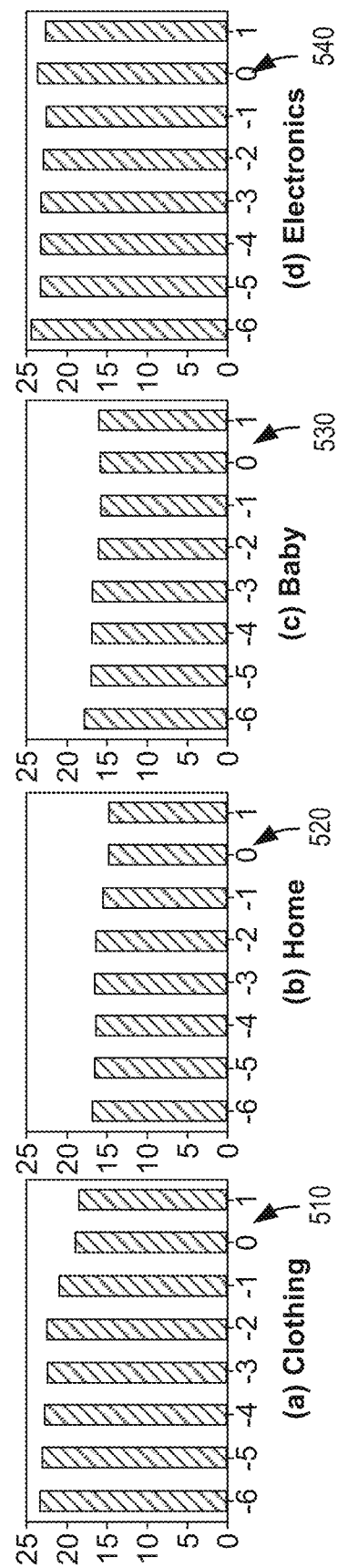
FIGS. 5A-D illustrate effects of altering an aggregation parameter on rates of viewing of recommended items, utilizing the item recommendation systems described herein.
Figure 6:
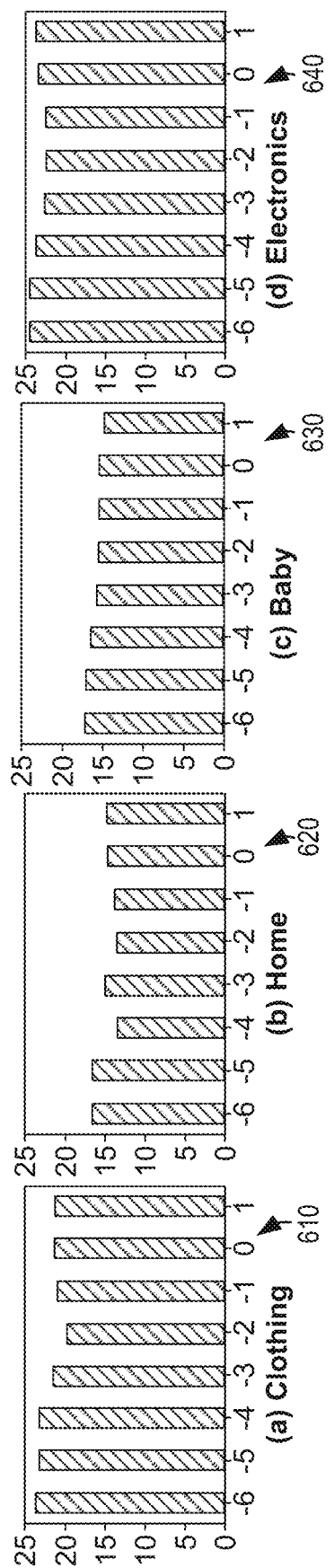
FIGS. 6A-D illustrate effects of altering a loss parameter on rates of viewing of recommended items, utilizing the item recommendation systems described herein.
Figure 7:
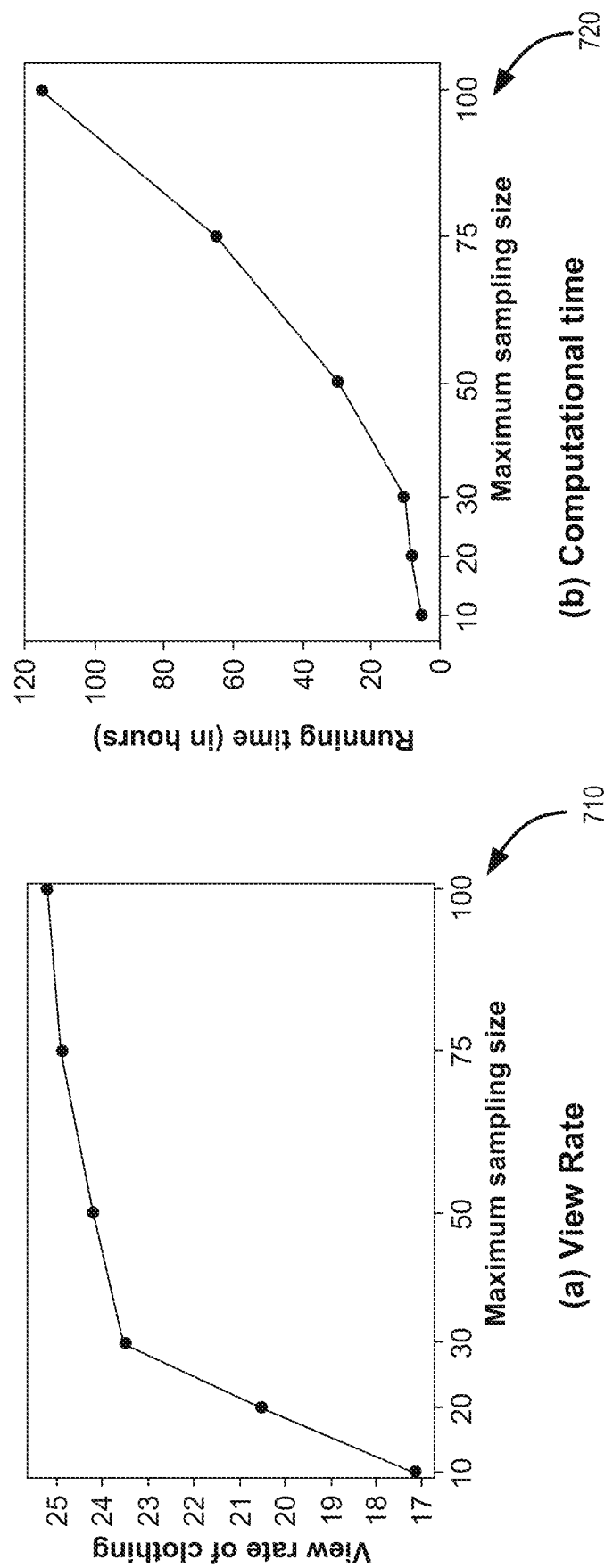
FIGS. 7A-B illustrate effects on view rate and computation time for different sample sizes, utilizing the item recommendation systems described herein.

FIG. 3 illustrates a flowchart of a method 300 for initializing a model useable to generate recommended items from within an item collection, such as items within a retail website. The method 300 can be used, for example, to set up the weighted graph used in the methods and systems described above in connection with FIGS. 1-2. Generally, the method 300 can include generating a graph of user behavior at step 302. As noted above, a graph can be generated from item images and item descriptions, with weights between items being generated based on item selection information (e.g., the likelihood that a user selecting one item will select another item from within the item collection). The item selection information can be based on user activity such as page views, item selections, purchases, etc. from a retailer website providing access to the item collection.

The method 300 can also include generating graph weights at step 304. As noted above, this can be performed using, for example, a Jaccard index or weighted co-occurrences. In the instance of a Jaccard index, the edges of a graph are weighted according to past customer views. Accordingly, weights are provided on all edges, and are calculated based on relative frequency of views for each pair of items. An arctangent-based transformation of the relative frequency is then generated. For example, for online items i and j, the relative frequency can be depicted as:

$$F(i, j) = \frac{VC(i \cap j)}{VC(i \cup j)}$$

where VC(i∩j) is the number of guests that view items i and j in one session and VC(i∩j) is the view counts for either item i or j being viewed in a session. In an online retail context, the relative view frequency F(i,j) for items i and j is usually very small; for example, a 3% common view is a relatively large number for a pair of items. Accordingly, the relative frequency is divided by a median of frequency in one category to scale to the weight function, s:(V,V)→(0,1). Accordingly, a weight function can be represented as:

$$s(i, j) = \frac{2}{\pi} \times \arctan\left(\frac{F(i, j)}{\text{median of } F}\right).$$

After this transformation, the weights are closer to a uniform distribution between 0-1.

In the case of weighted co-occurrences being used to generate weights, co-view counts are not the only action used; rather, other actions, such as adding an item to a cart or ultimately purchases of the two items together are features that are also utilized. In this example, different activities by a user are weighted using empirically determined weights. Additionally, a time delay on co-occurrences can be applied to capture the recency of items. In this example, weighted co-occurrence of products i and j for N customer session is given by:

$$s(i, j) = \sum_{s=1}^{s=N} W(i) W(j) / Rec(s)$$

where W(i) and W(j) are highest weights of products i and j in session s, and Rec(s) is recency of session s. Weights per node are then normalized and an arctangent transform is also applied to normalize the weights on a 0-1 scale. Other graph weighting approaches could be used as well.

Finally, the method 300 includes generating node embeddings at step 306. This includes, for example, generating embeddings based on image data associated with the item, as well as embeddings based on text data associated with the item. In example embodiments, node embeddings include image embeddings that are generated using a pre-trained model, such as a VGG-16 model described in Karen Simonyan and Andrew Zisserman. *Very deep convolutional networks for large-scale image recognition. arXiv preprint arXiv:* 1409. 1556, 2014. This publication is hereby incorporated by reference in its entirety. In such a model, a last fully connected layers are not used, but rather the output up to the convolutional layers and max-pool layers (i.e., the output of the average-pool layer, not the max-pool layer) are used. Item embeddings for text descriptions of the items are obtained by training a word embedding model on item attributes and descriptions included in an item collection. For example, item embeddings may be generated as described in: Tomas Mikolov, Ilya Sutskever, Kai Chen, Greg S Corrado, and Jeff Dean. *Distributed representations of words and phrases and their compositionality*. In *Advances in neural information processing systems*, pages 3111-3119, 2013. This publication is hereby incorporated by reference in its entirety.

Referring now to FIGS. 4-8, effects of altering various parameters or operations within the systems and methods described herein are depicted, as well as comparisons to existing item recommendation systems. As seen, by assessing and tuning parameters of the modeling systems described herein, useful item recommendations can be generated. This may be reflected, for example, in higher rates of selection of those recommended items by users.

For the testing performed in the below examples, separate models were trained for distinct categories of items, in this case, merchandise for an online retailer in the areas of clothing, home products, baby goods, and electronics items. These categories were selected because co-views or co-purchases across such a category have been found more relevant for users than have cross-category views or purchases. Additionally, different models are trained, based on an assumption that a role of item embeddings or image embeddings or past user behavior may differ depending on the category. Session logs for online user behavior as to each set of items were used. In this example, a word2vec algorithm was applied to item descriptions to generate 200 dimensional embeddings for the items in the categories, and image embeddings were generated using the VGG16 and ResNet-50 models (with the results depicted being based on the VGG-16 modeling).

For offline evaluation, past session logs of online user behavior were utilized. An offline evaluation to evaluate the performance of these embeddings against past user sessions was adopted. For example, if a user viewed item A and then viewed items B, C, D, E, and F in a past session, it was assumed that A is the seed item and items B/C/D/E/F are the actual views of the user. This is then compared to the recommendations from the model in consideration and the actual view rate is calculated. View rate, in terms of the present disclosure, corresponds to the percentage of users who looked at top N recommendations (N is typically set to 5 as most users look at top 5 recommendations only) and clicked on one of them.

FIGS. 4A-D illustrate effects of altering a sampling parameter on rates of viewing of recommended items, utilizing the item recommendation systems described herein. In particular, hyperparameter $\beta$ was altered in a range of 10-6 to 10, and the x-axis is the logarithmic of $\beta$. As can be seen in each category 410, 420, 430, 440, increasing $\beta$ improves view rate, particularly when $\beta=10$ (maximum in this experiment).

FIGS. 5A-D illustrate effects of altering an aggregation parameter on rates of viewing of recommended items, utilizing the item recommendation systems described herein. In particular, hyperparameter $\gamma$ was varied across each of the categories described above (clothing, home, baby, and electronics) over a similar range of values as $\beta$, above. As can be seen in FIGS. 5A-D, there is a significant dip in view rates for clothing in graph 510, as compared to relatively stable view rates for other categories, seen in graphs 520, 530, 540. Weighted aggregation seems to improve performance by lowering the relevance of low-weight neighbors.

FIGS. 6A-D illustrate effects of altering a loss parameter on rates of viewing of recommended items, utilizing the item recommendation systems described herein. In this example, an adjustment of loss parameter $\alpha$ is illustrated on a logarithmic scale (with the log-$\alpha$ on the x axis). As seen in FIGS. 6A-D, there is little impact on variance of $\alpha$ across categories. Low values of $\alpha$ have a slightly higher view rate across categories, seen in graphs 610, 620, 630, 640.

FIGS. 7A-B illustrate effects on view rate and computation time for different sample sizes, utilizing the item recommendation systems described herein. FIG. 7A illustrates a chart 710 showing that view rate increases significantly as sampling size increases to approximately 30 neighbors, then gradually increases. However, as seen in FIG. 7B, chart 720 illustrates that computational time significantly increases when the maximum sampling size exceeds 30 samples. This was performed in a graph with nodes having more than 100 neighbors, so sampling to a subset of those neighbors would be required. Accordingly, the data suggests a sample size of 30 or 50 would be ideal, given the improvement in view rates at those sample sizes and the trade-off with computational complexity. In the context of the tests above, for the clothing and home categories, a sample size of 30 was selected, and in electronics and baby categories, a sample size of 50 was selected.

FIGS. 8A-D illustrate effects of using various aggregation methodologies on rates of viewing of recommended items, utilizing the item recommendation systems described herein. As seen across the graphs 810, 820, 830, 840 across the categories, the GCN, mean aggregation, LSTM, mean pooling, and max pooling aggregation algorithms were assessed. In general, the "swag_mean" (the algorithm described above) and "mean_pooling" aggregators provide the best performance by a narrow margin. Further methods of using various aggregation methods are described in U.S. Patent Pub. No. 2020/0250734, titled "Item Recommendations Using Convolutions on Weighted Graphs," the entirety of which is incorporated herein by reference.

This is further reflected below in connection with Table 1, which illustrates an impact of input node embeddings.

TABLE 1

View Rates in Categories Based on Embeddings

| View Rate | ID | II | SAGE | SWAG | SAGE (+ID) | SWAG (+ID) | SAGE (+II) | SWAG (+II) | SAGE (+II + ID) | SWAG (+II + ID) |
|---|---|---|---|---|---|---|---|---|---|---|
| Clothing | 16.2 | 10.0 | 10.5 | 10.5 | 22.4 | 23.5 | 16.5 | 20.2 | 22.5 | 23.6 |
| Home | 12.0 | 12.5 | 5.3 | 5.3 | 14.2 | 16.5 | 13.2 | 14.5 | 14.3 | 16.5 |
| Electronic | 20.5 | 20.2 | 7.2 | 7.2 | 21.9 | 25.1 | 20.5 | 21.5 | 22.1 | 25.2 |
| Baby | 12.5 | 13.5 | 3.4 | 3.4 | 14 | 14.5 | 16.8 | 17.5 | 17.0 | 17.6 |

In Table 1, headers are as follows: ID=Item Description; II=Image; SWAG=the algorithm described herein, without node embeddings; SAGE: GraphSAGE without node embeddings.

From these view rates, it can be observed that item description embeddings perform slightly better than image embeddings for clothing, and almost equal to image embeddings for other categories. This can be attributed to rich item description information available, as well as imperfections in using direct product images to generate embeddings. Additionally, product attributes include useful information describing the product, while product images may have background colors or individuals. Finally, the SAGE and SWAG models have the same performance in absence of node embeddings. The computational time required for SWAG(+ID) is significantly lesser than the time required for SWAG(+II) and SWAG(+ID+II) variants. However, the performance (view rate) is better than or similar to those variants. For the Baby category, the basic SWAG model has very poor performance, but incorporating node embeddings improve the view rates significantly.

Figure 9:
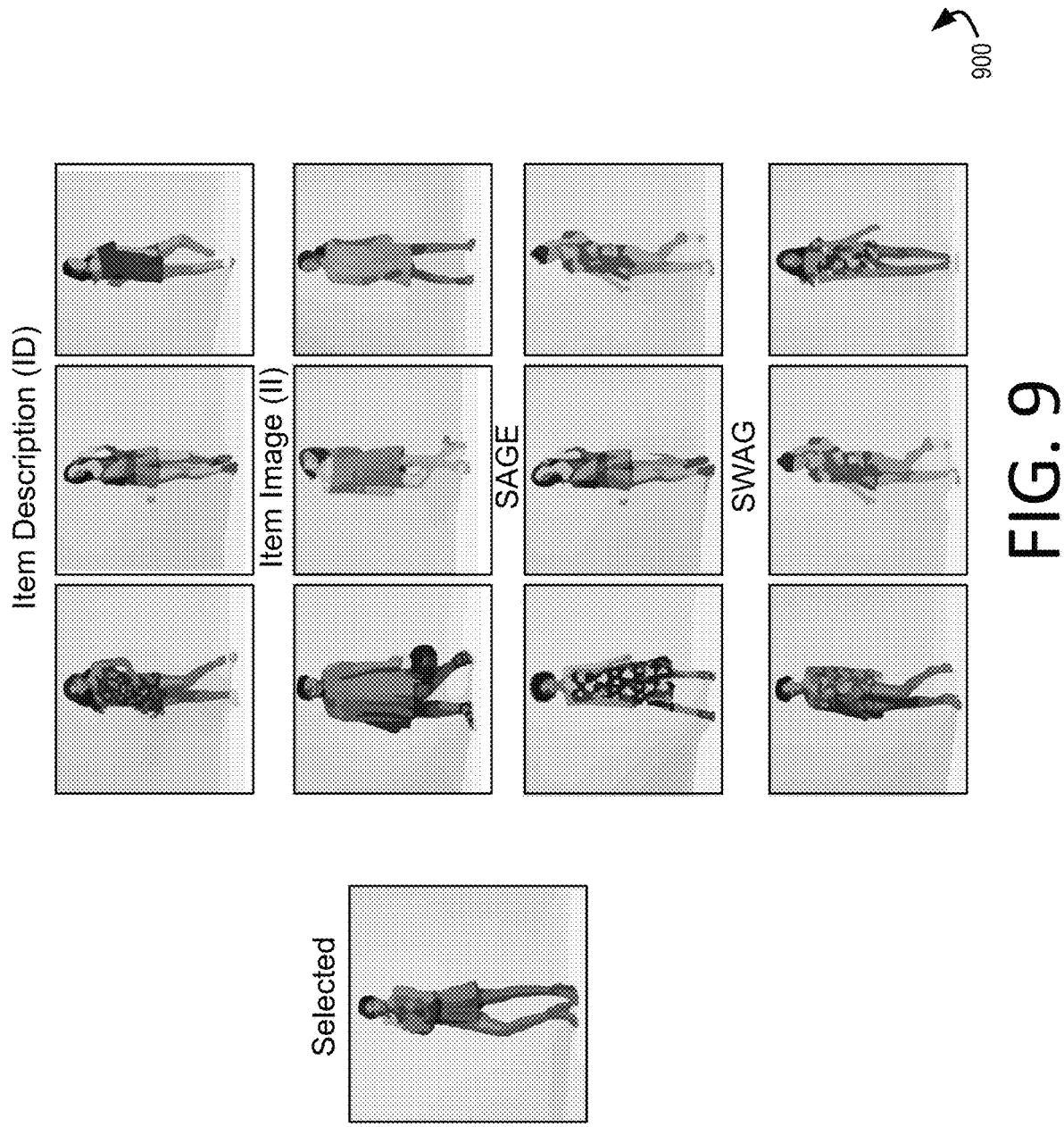
FIG. 9 illustrates an example set of recommended items based on similarity determinations performed using a plurality of different item recommendation algorithms.

FIG. 9 illustrates an example set of recommended items 900 based on similarity determinations performed using a plurality of different item recommendation algorithms. This represents a common sense or visual validation of the item recommendations generated using the methods and systems described herein. As seen, based on a selected item, use of item description alone, item image alone, GraphSAGE, or SWAG algorithms result in varied recommendations. A long-sleeve short dress is selected as a test item. The item embeddings seem to focus on short dresses but all the top three recommendations (in this example) are short sleeveless dresses while the seed item dress has long sleeves. SAGE and SWAG combine these cues with co-view information and improve recommendations. For example, the first recommendation by the SWAG recommendation system is a short dress with full sleeves.

Figure 8:
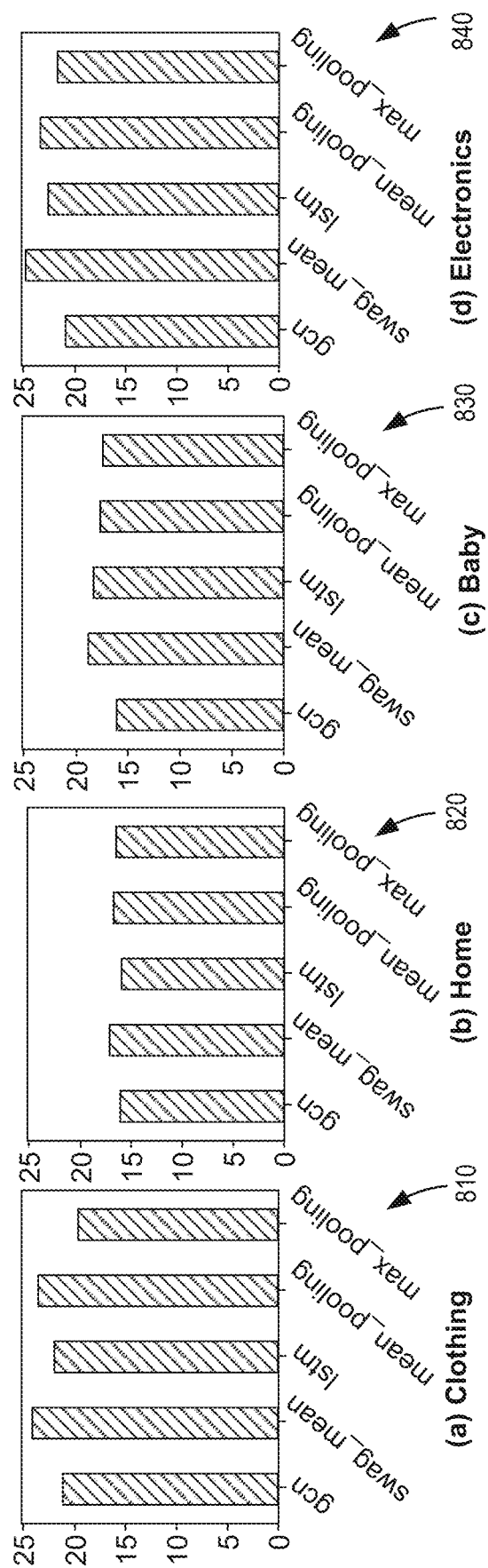
FIGS. 8A-D illustrate effects of using various aggregation methodologies on rates of viewing of recommended items, utilizing the item recommendation systems described herein.
Figure 10:
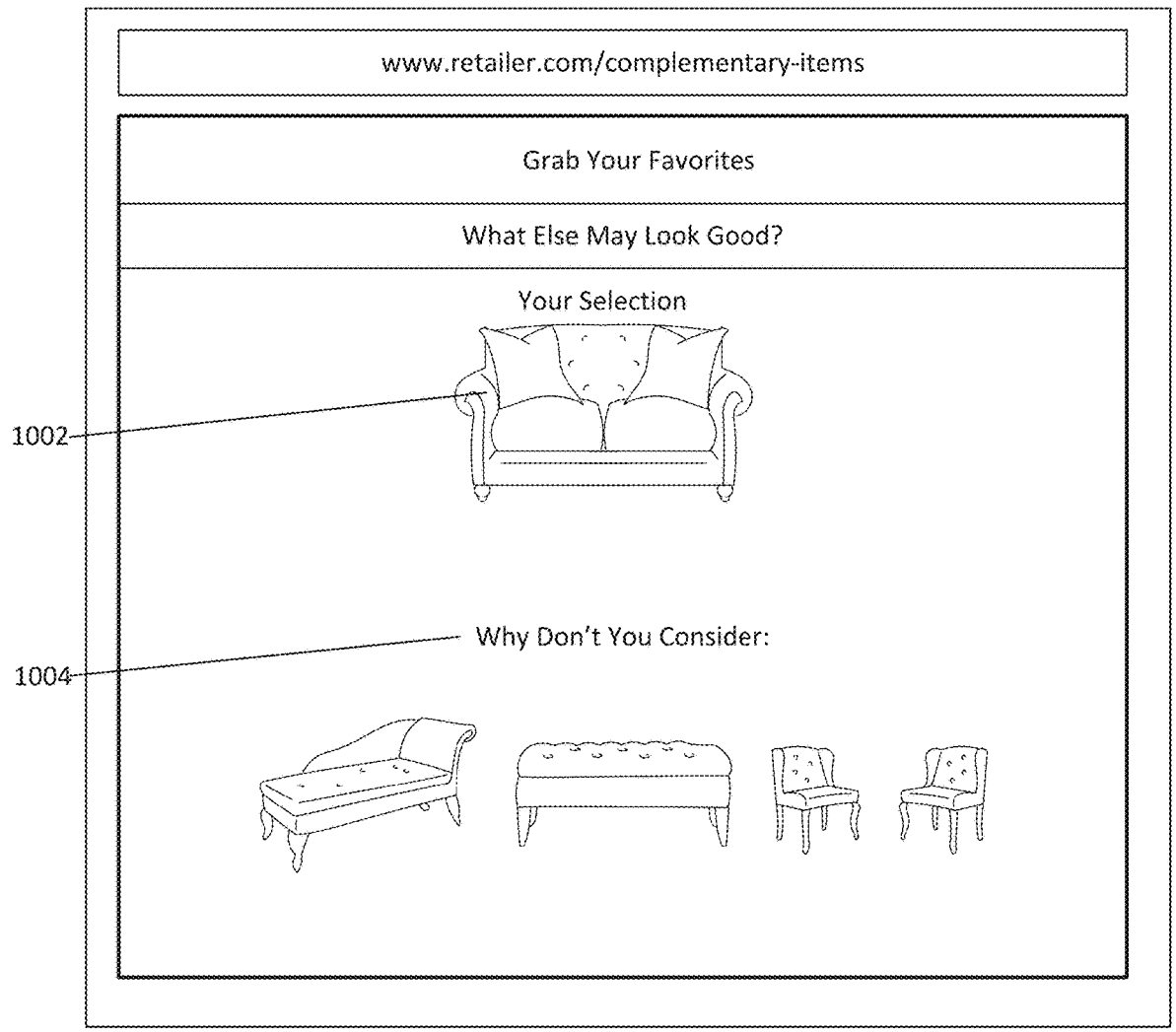
FIG. 10 illustrates a retailer interface useable for providing item recommendations, according to an example implementation.
Figure 11:
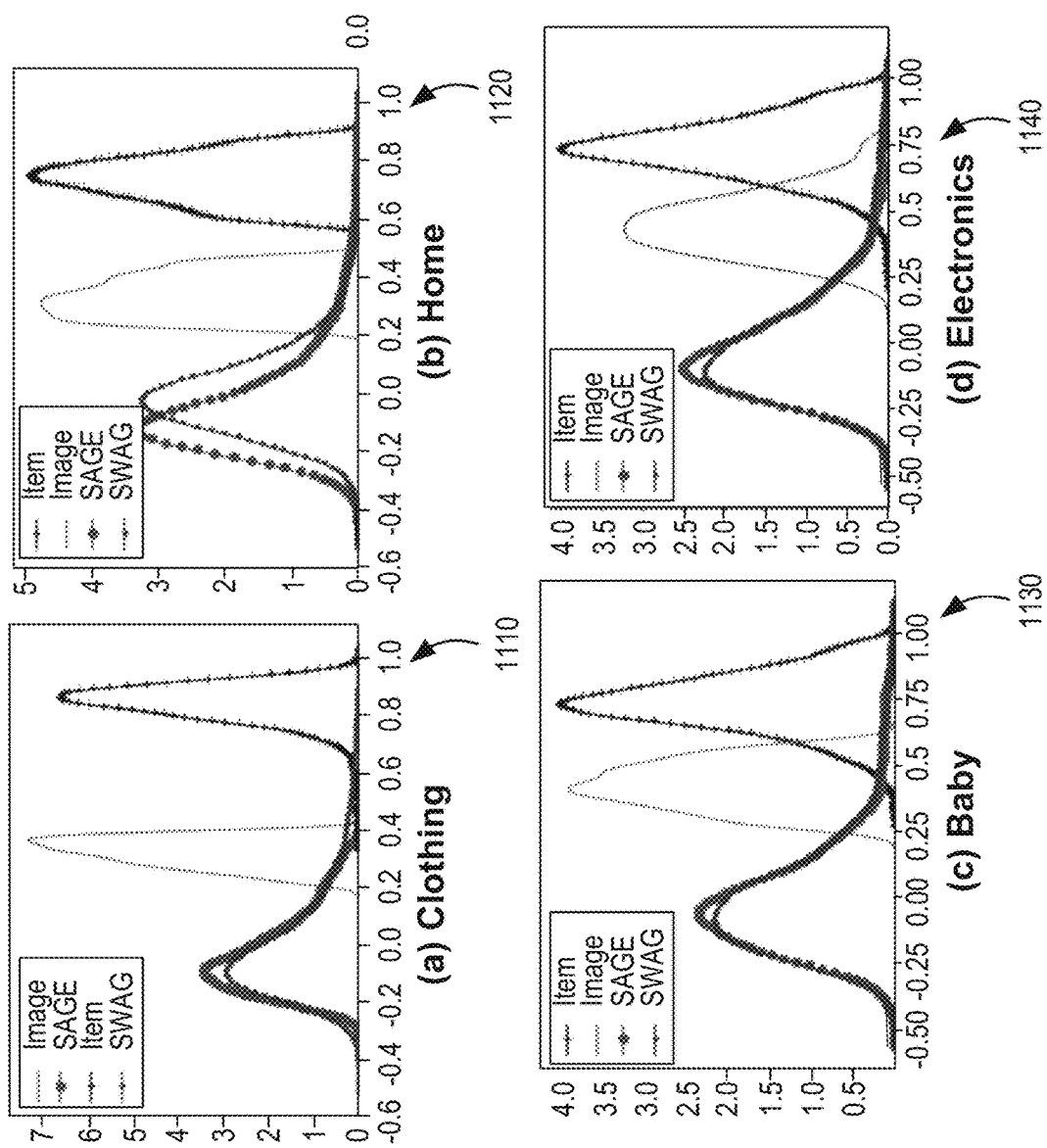
FIGS. 11A-D illustrate probability densities of pairwise cosine similarity for image embeddings, text embeddings, graph-based embeddings, and weighted graph-based embeddings.

FIG. 10 illustrates a retailer interface 1000 useable for providing item recommendations, according to an example implementation. The retailer interface 1000 can be presented within a retailer website, such as may be provided by a retail web server 12 as noted above. The retailer interface 1000 can present to a user a set of recommended products, e.g., based on a user selection of a particular item. As seen in the example, a selection of items 1004 can be presented to a user based on information returned to the retail web server 12 from system 10, in response to user selection of item 1002 (e.g., based on a determination using a weighted graph-based convolution, as described above). The specific recommendations will change according to which item is selected by the user, as well as the exact implementation chosen (as seen in FIG. 8).

FIGS. 11A-D illustrate probability densities of pairwise cosine similarity for image embeddings, text embeddings, graph-based embeddings, and weighted graph-based embeddings, the distribution of cosine similarities between pairs of items using Image, Item, SAGE, and SWAG embeddings across the four categories considered above (in graphs 1110, 1120, 1130, and 1140). SWAG has the most spread out distribution across categories, indicating the ability to distinguish between items of different relevance and also avoiding any collusion in approximate algorithms to find K nearest neighbors (such as LSH). This is useful, because an important indication of the effectiveness of the learned embeddings is the widely distributed distances between random pairs of output embeddings. If all items are at about the same distance (i.e., the distances are tightly clustered), then the embedding space does not have enough "resolution" to distinguish between items of different relevance.

Figure 12:
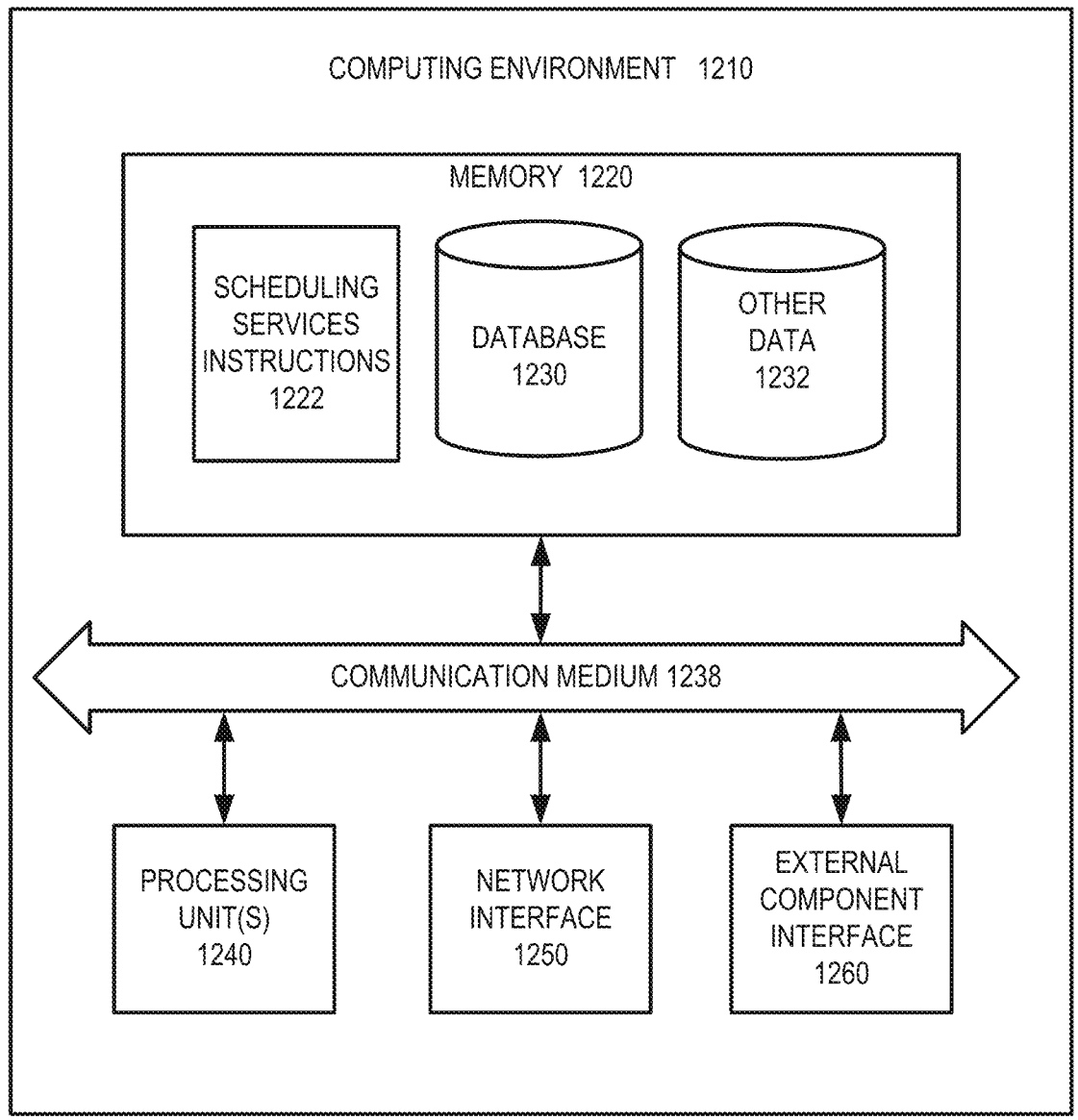
FIG. 12 illustrates an example computing environment with which aspects of the present disclosure can be implemented.

FIG. 12 illustrates an example system 1200 with which disclosed systems and methods can be used. In an example, the system 1200 can include a computing environment 1210. The computing environment 1210 can be a physical computing environment, a virtualized computing environment, or a combination thereof. The computing environment 1210 can include memory 1220, a communication medium 1238, one or more processing units 1240, a network interface 1250, and an external component interface 1260.

The memory 1220 can include a computer readable storage medium. The computer storage medium can be a device or article of manufacture that stores data and/or computer-executable instructions. The memory 1220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1220 can store various types of data and software. For example, as illustrated, the memory 1220 includes scheduling services instructions 1222 for implementing one or more aspects of the scheduling services described herein, database 1230, as well as other data 1232. In some examples, the memory 1220 can include instructions for generating a website and/or maintaining product information.

The communication medium 1238 can facilitate communication among the components of the computing environment 1210. In an example, the communication medium 1238 can facilitate communication among the memory 1220, the one or more processing units 1240, the network interface 1250, and the external component interface 1260. The communication medium 1238 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1240 can include physical or virtual units that selectively execute software instructions. In an example, the one or more processing units 1240 can be physical products comprising one or more integrated circuits. The one or more processing units 1240 can be implemented as one or more processing cores. In another example, the one or more processing units 1240 are implemented as one or more separate microprocessors. In yet another example embodiment, the one or more processing units 1240 can include an application-specific integrated circuit (ASIC) that provides specific functionality. In yet another example, the one or more processing units 1240 provide specific functionality by using an ASIC and by executing computer-executable instructions.

The network interface 1250 enables the computing environment 1210 to send and receive data from a communication network (e.g., network 140). The network interface 1250 can be implemented as an Ethernet interface, a token-ring network interface, a fiber optic network interface, a wireless network interface (e.g., WI-FI), or another type of network interface.

The external component interface 1260 enables the computing environment 1210 to communicate with external devices. For example, the external component interface 1260 can be a USB interface, Thunderbolt interface, a Lightning interface, a serial port interface, a parallel port interface, a PS/2 interface, and/or another type of interface that enables the computing environment 1210 to communicate with external devices. In various embodiments, the external component interface 1260 enables the computing environment 1210 to communicate with various external components, such as external storage devices, input devices, speakers, modems, media player docks, other computing devices, scanners, digital cameras, and fingerprint readers.

Although illustrated as being components of a single computing environment 1210, the components of the computing environment 1210 can be spread across multiple computing environments 1210. For example, one or more of instructions or data stored on the memory 1220 may be stored partially or entirely in a separate computing environment 1210 that is accessed over a network.

Referring to FIGS. 1-12 overall, it is noted that the methods and systems described herein have a number of advantages over existing systems with respect to improving performance of generating item recommendations. It is noted that by way of comparison to other algorithms for generating item recommendations, improvements in view rates of 15-35% can be obtained, particularly over visual recommendations, or visual and behavioral recommendations based on other network types. Still further, the systems of the present disclosure can easily be tuned by adjusting parameters for a particular category based on number of neighbors in that category, to account for computing performance and accuracy. Other advantages are present as well, as described herein.

Figure 13:
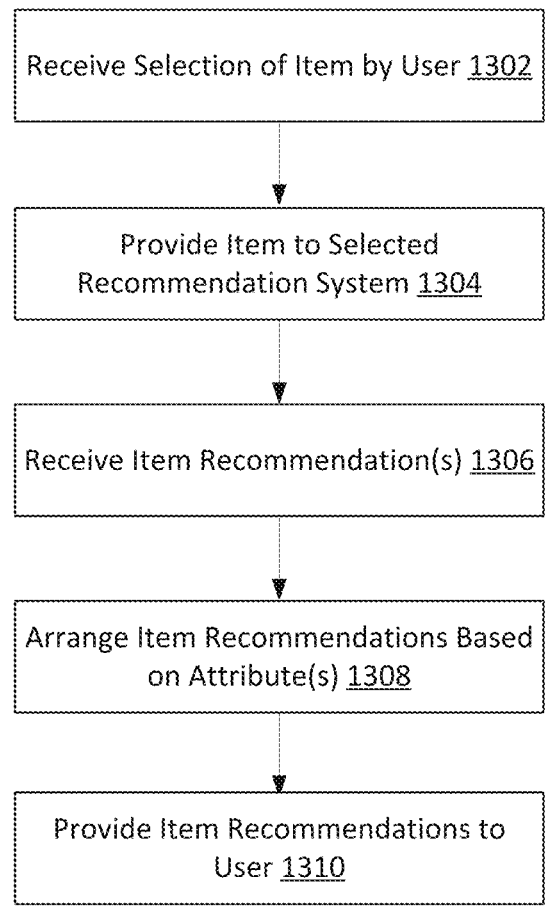
FIG. 13 illustrates a flowchart of a method for providing faceted, attribute-based item recommendations in response to user selection of a particular item, according to an example embodiment.
Figure 14:
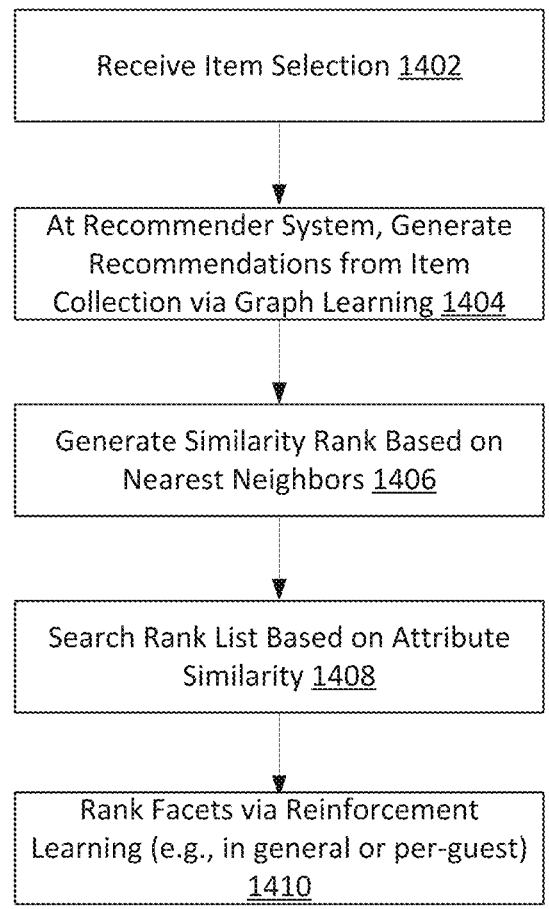
FIG. 14 illustrates a flowchart of a method for generating faceted, attribute-based item recommendations according to an example embodiment.
Figure 15:
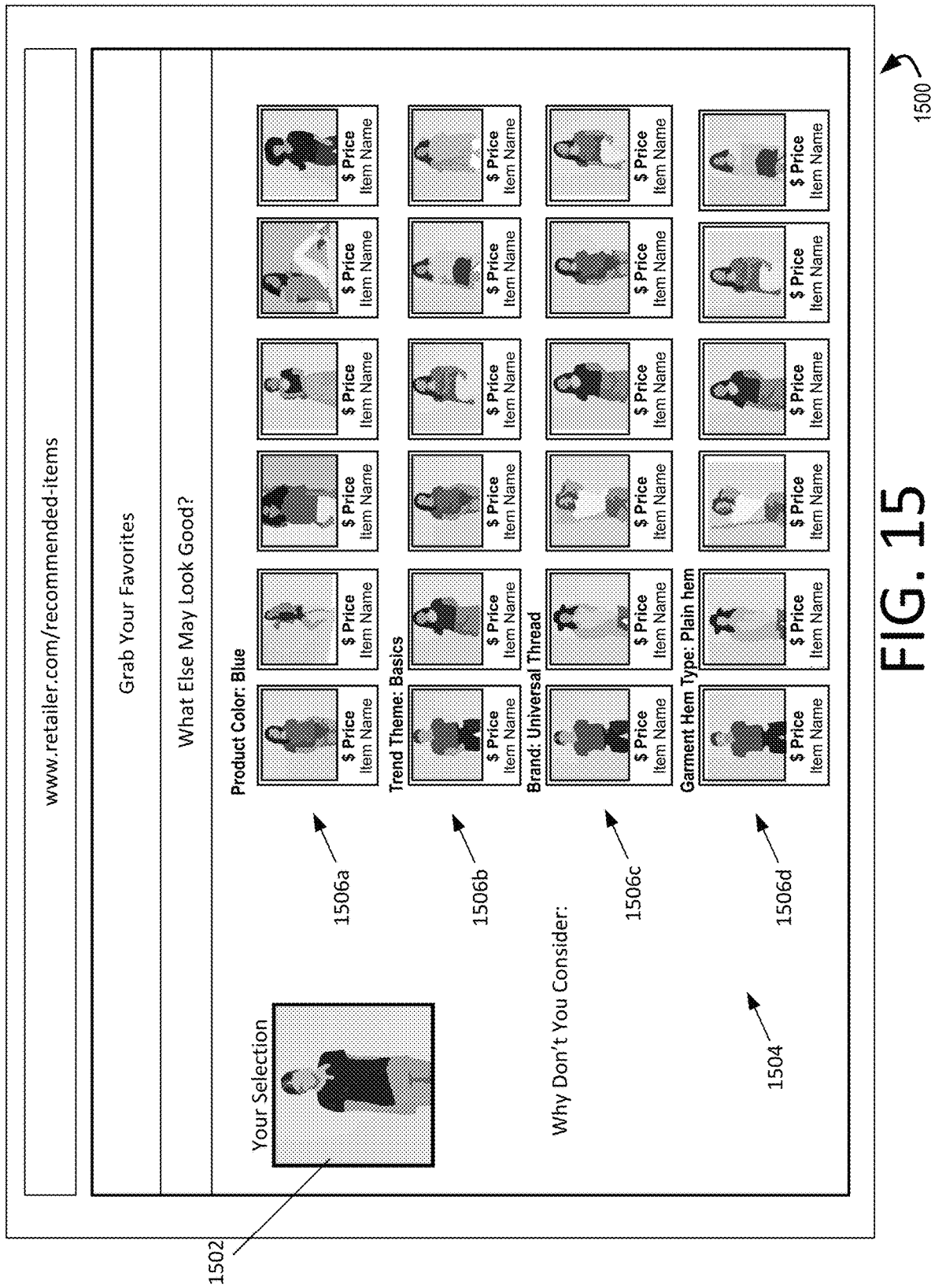
FIG. 15 illustrates a retailer interface usable for providing faceted, attribute-based item recommendations according to an example implementation.

Referring now to FIGS. 13-15, methods and systems for presenting faceted item recommendations are illustrated. Generally, the methods and systems described herein allow a retailer to present a collection of items in a logical manner to a user who has selected an item. The collection of items may be logically related to the item, for example along a facet that is associated with the item. The facet may be, for example, an attribute of the item, or a different characteristic of the item associated with the attribute.

FIG. 13 illustrates a flowchart of a method 1300 for providing faceted, attribute-based item recommendations in response to user selection of a particular item, according to an example embodiment. In the embodiment shown, the method 1300 includes receiving a selection of an item by a user at step 1302. Receiving the selection of the item may be performed at an item recommendation computing system, which may receive an identification of a particular item that was selected by a user at a retail website. The item selected by the user may be an item from an item collection available at a retail website, and may be selected by the user via browsing, searching, etc. The item selection may be provided to an item recommendation system, at step 1304, for purposes of generating item recommendations based on that selected item. The item recommendation system may be, for example, a weighted graph-based item recommendation system such as described above in conjunction with FIGS. 2-11. Of course, other item recommendation systems may be used as well. In some instances, where multiple item recommendation systems are available, one or more of the available item recommendation systems may be selected.

In the embodiment shown, the method 1300 includes receiving item recommendations from the selected item recommendation system at step 1306. In example embodiments, the item recommendations are provided as a ranked list of items based on the items being nearest nodes in a weighted graph-based item recommendation system. Accordingly, the ranked list of items may be near to, or similar to, the selected item based on a variety of different factors which are unique to each recommended item. In such an embodiment, the method 1300 may also include arranging the item recommendations based on specific facets, or attributes at step 1308. For example, as noted above, the ranked list of items may be parsed to identify a sub-collection of items that are "near" the selected item in a weighted graph for a similar reason (e.g., because a particular attribute strongly identifies the items as similar). An automated arranging process may group the items by facet or attribute, and optionally rank order the facets or attributes based on the overall similarity of items associated with the facet or attribute to the originally selected item. The item recommendations may then be provided to the user at step 1310. Providing the item recommendations to the user may include, for example, generating or providing a user interface, or providing a listing of items for inclusion in such a user interface, such that items having a common facet or attribute are presented in a grouping for consideration by the user. An example of such a user interface is seen in FIG. 15, below.

Referring now to FIG. 14, a method 1400 is illustrated for generating faceted, attribute-based item recommendations according to an example embodiment. The method 1400 may be performed by an item recommendation system, such as the weighted graph-based item recommendation system described herein. In the embodiment shown, the method 1400 includes receiving an item selection at step 1402. The method further includes, at the recommender system, generating recommendations from an item collection via a weighted graph-based model at step 1404. Still further, the method 1400 includes generating a similarity rank based on nearest neighbors to the selected item at step 1406. The nearest neighbors can be aggregated in a ranked list of similar items to the selected item.

In the embodiment shown, the method 1400 includes searching the ranked list of nearest neighbors to identify items having a relationship to the selected item based on a common attribute or facet at step 1408. Those items having a common attribute or facet may be grouped, and multiple groups according to different attributes or facets may be formed. Each group, or facet, may then be ranked at step 1410. Ranking of the facets or groups may be performed in a variety of ways. For example, in some instances, reinforcement learning may be used to improve ranking of the facets. At least in some cases, at an initial stage, a crowd sourcing process may be used to set an initial ranking of the groups or facets. Other methods for ranking may be utilized as well, for example, identifying an average or overall distance of the items in the group from the selected item and ranking groups according to that average or overall distance.

FIG. 15 illustrates a retailer interface 1500 usable for providing faceted, attribute-based item recommendations according to an example implementation. In the example shown, the retailer interface 1500 is able to be presented within a retailer website. In alternative embodiments, the retailer interface 1500 may be modified for display on a small format device, such as a mobile device.

In the example shown, the retailer interface 1500 includes a depiction of a selected item 1502. The selected item, in this example, corresponds to a blue t-shirt. The selected item 1502 may also be presented with a variety of other information, such as item description information, price information, brand information, shipping information, or other types of information known to be presentable on a retailer website. In the example shown, one or more faceted recommendation regions 1506*a-d* may be presented to a user within the retailer interface 1500. For example, the faceted recommendation regions 1506*a-d* may be generated based on automatically identified facets, or categories, of attributes that are common to items that are nearby the selected item in the generated weighted graph. For example, a first faceted recommendation region 1506*a* displays other shirts having a common attribute of a blue color. A second faceted recommendation region 1506*b* displays other items having a common attribute of being a basic t-shirt. A third faceted recommendation region 1506*c* displays other items having a common attribute of shirts of the same brand as the selected item. A fourth faceted recommendation region 1506*d* displays other items having a common attribute of being a shirt having a plain hem.

Overall, it is noted that although four faceted recommendation regions are displayed in the retailer interface 1500, more or fewer such regions may be displayed. Still further, more or fewer items may be presented within each region, and different numbers of items may be presented within each region. Additionally, the regions may be organized differently, for example, by presenting the regions in an order determined based on the facet rankings described above in conjunction with FIG. 14.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating and presenting item recommendations to a user at a retail website, the method comprising:
   receiving a selection of an item from an item collection, the item collection corresponding to items available for purchase from the retail website;
   generating a set of item recommendations based on the selected item, the set of item recommendations being generated based on a selection of a predetermined number of nearest neighbors from a weighted graph of items included in the item collection;
   identifying a plurality of facets in the set of item recommendations;
   for each facet of the plurality of facets, associating a subset of items from the set of item recommendations with the facet based on a common attribute; and
   generating a user interface including the selected item and a plurality of faceted recommendation regions, each faceted recommendation region corresponding to a facet of the plurality of facets, and each faceted recommendation region displaying at least some of the subset of items associated with the facet.

2. The method of claim 1, wherein each facet of the plurality of facets is identified from an item description, an item image, and a past purchase behavior of the user.

3. The method of claim 1, wherein the common attribute is automatically identified from among the set of item recommendations.

4. The method of claim 1, wherein the common attribute is selected from a group of attributes consisting of: a brand; a color; an apparel style; and an apparel type.

5. The method of claim 1, wherein inclusion of an item from the set of item recommendations in a subset of items associated with a facet of the plurality facets is based on having a variety of different properties/categories of a selected attribute among the items included in the subset of items.

6. The method of claim 1, wherein the plurality of faceted recommendation regions are displayed in a ranked order.

7. The method of claim 1, further comprising ranking the plurality of facets.

8. The method of claim 7, wherein ranking the plurality of facets includes applying a reinforcement learning algorithm to the plurality of facets based on the selected item by the user from one of the plurality of faceted recommendation regions of the user interface.

9. An item recommendation system comprising:
   a recommendation generation computing system comprising a processor and a memory, the memory storing instructions executable by the processor to perform:
      receive a selection of an item from an item collection, the item collection corresponding to items available for purchase from a retail website;
      generate a set of item recommendations based on the selected item, the set of item recommendations being generated based on a selection of a predetermined number of nearest neighbors from a weighted graph of items included in the item collection;
      identify a plurality of facets in the set of item recommendations; and
      for each facet of the plurality of facets, associate a subset of items from the set of item recommendations with the facet based on a common attribute;
   wherein the item recommendation system, responsive to identifying the subset of items, generates a user interface including the selected item and a plurality of faceted recommendation regions, each faceted recommendation region corresponding to a facet of the plurality of facets, and each faceted recommendation region displaying at least some of the subset of items associated with the facet.

10. The system of claim 9, further comprising:
a retail server communicatively connected to the recommendation generation computing system, the retail server being configured to generate the user interface and provide the user interface to a user.

11. The system of claim 10, wherein the user interface including the selected item and the plurality of faceted recommendation regions is provided within the retail website.

12. The system of claim 10, wherein the retail server comprises at least one of an application server and a web server.

13. The system of claim 10, further comprising a user device communicatively connected to the retail server and the recommendation generation computing system, the user device being configured to display the user interface via the retail website.

14. A system for generating item recommendations, the system comprising:
a computing system comprising a plurality of computing devices, the plurality of computing devices including a retail website server and an item recommendation computing device, the computing system storing instructions which, when executed, cause the computing system to:
generate a set of item recommendations based on the selected item, the set of item recommendations being generated based on selection of a predetermined number of nearest neighbors from a weighted graph of items included in an item collection;
receive a user selection of an item from the item collection;
provide the selection to the item recommendation computing device via an API;
in response to receiving the selected item, identify, at the item recommendation computing device, a plurality of facets in the set of item recommendations, for each facet of the plurality of facets, associate a subset of items from the set of item recommendations with the facet based on a common attribute; and
generate, at the retail website server, a user interface including the selected item and a plurality of faceted recommendation regions, each faceted recommendation region corresponding to a facet of the plurality of facets, and each faceted recommendation region displaying at least some of the subset of items associated with the facet.

15. The system of claim 14, wherein each facet of the plurality of facets is identified from an item description, an item image, and a past purchase behavior of a user.

16. The system of claim 15, wherein inclusion of an item from the set of item recommendations in a subset of items associated with a facet of the plurality of facets is based on having a variety of different properties/categories of a selected attribute among the items included in the subset of items.

17. The system of claim 16, wherein the selected attribute is selected from a group of attributes consisting of: a brand; a color; an apparel style; and an apparel type.

18. The system of claim 14, wherein each of the faceted recommendation regions displayed on the user interface includes up to five recommended items.

19. The system of claim 14, wherein the plurality of faceted recommendation regions are displayed in a ranked order.

* * * * *